Patented Nov. 15, 1938

2,136,771

UNITED STATES PATENT OFFICE 2,136,771

RUBBER COMPOSITION AND METHOD OF COMPOUNDING RUBBER

Charles H. Campbell, Kent, Ohio

No Drawing. Application May 31, 1938,
Serial No. 211,044

3 Claims. (Cl. 106—23)

This invention relates to improvements in rubber compositions and in the method of compounding rubber. The term "rubber" includes either natural rubber or reclaimed rubber or a combination of both, and by "reclaimed rubber" is meant the rubber obtained by the devulcanizing of vulcanized rubber or rubber compositions.

Among the objects of the invention is to provide in a rubber composition or mix a reinforcing agent or filler possessing no properties harmful to rubber over a long period of time. More particularly it is among my objects to provide a reinforcing agent or filler capable of making the rubber soft, tacky and dead in character before vulcanizing though resilient, elastic and tough with an excellent grain when vulcanized. Additionally it is an object to provide a method of compounding rubber with the reinforcing agent or filler referred to.

I have found that the objects of my invention are best attained if the rubber (before the usual process of milling of refining in the case of reclaims) prior to vulcanizing has mixed or compounded with it by ordinary processes certain cleavage products obtained by the hydrolytic decomposition of the epidermis or outer skin of animals, such as hogs, steers, sheep, goats and other animals, tame or wild.

The derivatives or cleavage products employed as a reinforcing agent or filler in accordance with my invention are those obtained by the hydrolytic decomposition of the epidermis of animals to the point of obtaining soluble and diffusible cleavage products but preferably short of such hydrolytic decomposition as will form amino-acids, though same may be present, and preferably also those soluble and diffusable cleavage products obtained by the hydrolytic decomposition of the epidermis of animals through the influence of heat and pressure by steam.

In this country, the slaughtering and subsequent treatment of hogs is usually carried out in a manner that permits recovery of the epidermis, and prior to my invention the epidermis was disposed of as waste which had no known value of any consequence. After killing, the hogs are subjected to a scalding treatment which loosens the epidermis from the under skin and then they are scraped. This scraping removes the epidermis and dehairs the animals, providing a mixture of epidermis, hair and bristles which is cleansed or washed with a suitable agent and the hair and bristles separated from the epidermis, the latter being thrown away as waste. The foregoing treatment of hogs is well understood in the art.

The epidermis remaining after the separation of hair and bristles, after being subjected to further treatment that will be referred to, is the material I use in the treatment of rubber. While there may be some impurities in this material, such as very short hairs which are unavoidably retained, a little blood albumen, and possibly a small amount of salts which are usually found in the epidermis of any animal, the material constitutes largely the epidermis and is to be so considered herein. Of course, the epidermis of animals other than hogs can also be used, but with most other animals that are butchered on a large scale, the hair or fur is usually removed by the action of a depilatory, thus making it difficult, if not impossible, to recover the epidermis. Accordingly, I prefer to use the epidermis of hogs since this material is readily available in large quantities.

I take the recovered epidermis and place it in a closed digester to hydrolyze and decompose it. Hydrolytic decomposition is effected by admitting steam to the digester and in some instances a small amount of caustic soda may be added. Steam admitted at 100 lbs. pressure for approximately two hours has been found to be ample in connection with the epidermis obtained from young animals. With the older epidermis, however, it is desirable to carry on the digesting process for a longer period of time as for example even up to six hours. The process can be hastened, however, by increasing the steam pressure or superheating the steam. The difficulty with the higher steam pressures, however, especially when epidermis of a miscellaneous type is being treated in large quantities at one time, such as 15,000 to 20,000 pounds or more, is that the higher steam pressures when long continued are apt to have a too drastic action on the epidermis and produce an undue proportion of the amino-acids. Accordingly it is desirable to raise the steam pressure gradually and to remove the soluble cleavage products at intervals rather than make one long digestion to prevent the first fraction of cleavage products formed, from hydrolyzing through into the amino-acid group although at times some may be present. Thus steam might first be admitted to the digester at about 60 pounds pressure for about two hours, the steam then shut off, pressure on the digester relieved and the soluble products thus far formed removed. Steam might then be admitted at 80 pounds pressure for a further period of two hours, the steam then shut off, the pressure relieved and the soluble products again removed. Steam may then well be admitted to the digester at 100 pounds pressure for a period of at least two hours depending upon the condition of the mass within the digester. The resulting material is a flowable liquid, usually of a dark color, in which the epidermis has been fully dissolved.

At the expiration of the hydrolyzing process the liquid material is passed to a suitable dryer wherein all except about 2% to 3% of the moisture content is preferably removed. Any commonly accepted drying process may be used and I prefer to use either an open pan or a stick roll in drying. This gives us a dried, solid material which is next ground up into a fine powder, which should be immediately bagged in moisture proof bags to prevent caking.

The epidermis derivatives thus obtained constitute the reinforcing agent or filler of my invention which is mixed or compounded preferably in its powdered form with the rubber, before vulcanizing in the ordinary manner.

In compounding reclaims the powder is preferably added after the rubber leaves the dryer, the rubber usually having enough moisture content to permit dispersion of the powder through the rubber. With natural rubber it is desirable, though not necessarily essential, to make up a master batch with my powder in it and then use the desired percentage of the master batch with additional rubber.

The epidermis is an albuminous protein distinctly different in character and makeup from keratin, collagen or elastin, which are also animal proteins. With the latter animal proteins it usually requires from 3% to 6% thereof by weight added to rubber in order to produce the desired result, whereas, with the present material as little as 2% by weight can be satisfactorily used, producing a result which, according to tests made, is as high as 20% better than has heretofore been possible with other materials, this increase being noticeable in both the compounded product and the finished product.

Among the reasons why rubber compounded with epidermis is more satisfactory is that epidermis does not appear to be detrimentally affected by the high temperatures used in treating rubber. The finished rubber product is resilient and pliable, is capable of a very large number of flexing actions without cracking, is tough, and is not subject to the deterioration that sometimes takes place when other animal products are compounded with rubber.

It will be apparent that modifications of the invention may be resorted to without departing from the spirit thereof or from the scope of the subjoined claims.

What is claimed is:

1. A rubber composition comprising rubber having compounded with it soluble and diffusible cleavage products obtained by the hydrolytic decomposition of a mixture comprising the epidermis of hogs and such foreign matter as may be present after removal and separation of the hair or bristles from said epidermis, and which cleavage products are substantially short of amino-acids.

2. A rubber composition comprising rubber having compounded with it soluble and diffusible cleavage products obtained by the hydrolytic decomposition by steam and pressure of a mixture comprising the epidermis of hogs and such foreign matter as may be present after removal and separation of the hair or bristles from said epidermis, and which cleavage products are substantially short of amino-acids.

3. In the method of compounding rubber, the step of adding thereto prior to vulcanization soluble and diffusible cleavage products obtained by the hydrolytic decomposition of a mixture comprising the epidermis of hogs and such foreign matter as may be present after removal and separation of the hair or bristles from said epidermis, and which cleavage products are substantially short of amino-acids.

CHARLES H. CAMPBELL.